(12) United States Patent
Hartgrove

(10) Patent No.: US 7,816,287 B1
(45) Date of Patent: Oct. 19, 2010

(54) FLAME RETARDANT NONWOVEN FABRIC AND BEDDING ARTICLES

(75) Inventor: Herbert P. Hartgrove, Dunn, NC (US)

(73) Assignee: Polymer Group, Inc., Charlotte, NC (US)

( * ) Notice: Subject to any disclaimer, the term of this patent is extended or adjusted under 35 U.S.C. 154(b) by 0 days.

(21) Appl. No.: 12/501,132

(22) Filed: Jul. 10, 2009

(51) Int. Cl.
*B32B 27/04* (2006.01)
*B32B 27/12* (2006.01)
*B32B 5/02* (2006.01)

(52) U.S. Cl. .................. 442/136; 428/920; 428/921
(58) Field of Classification Search .................. 442/136; 428/920, 921
See application file for complete search history.

(56) References Cited

U.S. PATENT DOCUMENTS

| | | | |
|---|---|---|---|
| 5,503,915 A | 4/1996 | Ichibori et al. | |
| 5,578,368 A | 11/1996 | Forsten et al. | |
| 6,491,727 B1 | 12/2002 | Rearick et al. | |
| 6,858,550 B2 | 2/2005 | Ahluwalia | |
| 7,005,089 B2 | 2/2006 | Takeuchi et al. | |
| 7,125,460 B2 | 10/2006 | Ogle et al. | |
| 7,147,734 B2 | 12/2006 | Ogle et al. | |
| 7,211,293 B2 | 5/2007 | Piana et a | |
| 7,244,322 B2 | 7/2007 | Ogle et al. | |
| 7,279,220 B2 | 10/2007 | Nishino et al. | |
| 7,294,673 B2 | 11/2007 | Kanazawa | |
| 7,361,617 B2 | 4/2008 | Ahluwalia | |
| 2004/0097156 A1* | 5/2004 | McGuire et al. | 442/361 |
| 2004/0198125 A1 | 10/2004 | Mater et al. | |
| 2006/0234592 A1* | 10/2006 | Mio et al. | 442/414 |

OTHER PUBLICATIONS

16 CFR Part 303.7, Jan. 1, 2009, pp. 224-226.

* cited by examiner

*Primary Examiner*—Norca L Torres-Velazquez
(74) *Attorney, Agent, or Firm*—Kilyk & Bowersox, P.L.L.C.; Valerie Calloway

(57) ABSTRACT

A flame retardant cellulosic-based nonwoven fabric is provided having a synergistic blend of cellulosic and acrylic fiber that imparts unexpectedly enhanced flame retardant performance. The flame retardant finished nonwoven fabric can have at least about 15 wt % and no greater than about 35 wt % acrylic fiber and at least about 65 wt % and no greater than about 85% cellulosic fiber, where the nonwoven fabric has a char strength of at least 0.9 Newtons and exhibits a basis weight loss of no more than 7 wt % when exposed to a gas flame for 240 seconds. Bedding articles including the flame retardant finished nonwoven fabric are also provided.

20 Claims, 7 Drawing Sheets

FLAME RETARDANT NONWOVEN FABRIC AND BEDDING ARTICLES

TECHNICAL FIELD

The present invention relates to a flame retardant nonwoven fabric. The present invention also relates to bedding articles that incorporate the flame retardant nonwoven fabric.

BACKGROUND OF THE INVENTION

Increased awareness and concerns about fire prevention in homes, businesses, and industrial settings have spurred the enactment of standards and legislation in both the United States and abroad directed to reducing the risk of fires. From a regulatory standpoint, these concerns have encompassed bedding and upholstered articles in particular.

For many years mattress flammability in the United States has been regulated under a cigarette ignition standard in the Code of Federal Regulations under 16 C.F.R. §1632. More recent standards further require assessment of the product's flammability when exposed to an open flame ignition source. For instance, the state of California enacted an open flame standard for mattresses, effective since January 2005, as California Technical Bulletin 603. The testing specified by California Technical Bulletin 603 of the State of California Department of Consumer Affairs ("TB-603") exposes the top and side of a mattress to an open gas flame, and, following the exposure, the mattress and foundation are monitored for thirty minutes to measure heat generation rate and total heat generation. In July 2007 the United States Consumer Products Safety Commission (CPSC) enacted a regulation under 16 C.F.R. §1633 for an open flame nationwide standard for mattresses, which is patterned after Technical Bulletin 603 in many respects. Open flame flammability testing of bedclothing, such as filling materials used in bedclothing items such as comforters and bedspreads, also is the subject of proposed regulations in the United States at the Federal level (e.g., proposed 16 C.F.R. §1634) and state level (e.g., draft California Technical Bulletin 604).

Prior to the present invention, numerous flame resistant fabric designs have involved inclusion of conventionally-recognized flame retardant or self-extinguishing fibers to impart flame retardancy, such as glass fibers, oxidized polyacrylonitrile (PAN) fibers, modacrylic fibers, and so forth. Conventional flame retardant and self-extinguishing fibers can entail costlier chemistries, require special processing, detract from fabric hand (feel), resiliency, or other fabric properties, or have other drawbacks. For instance, numerous conventional flame retardant fibers require various comonomer chemistries, halogen chemistries, and/or carbonization treatments, and so forth. In alternative designs, flame retardant topical coatings have been used on some nonwoven fabrics in manners believed to provide optimal flame retardance.

SUMMARY OF THE INVENTION

The present invention is directed to cellulosic-based nonwoven fabrics having unique and unexpectedly good flame retardancy.

A flame retardant finished nonwoven fabric of various embodiments of the present invention comprises at least about 15 wt % and no greater than about 35 wt % acrylic fiber, and at least about 65 wt % and no greater than about 85 wt % cellulosic fiber, wherein the nonwoven fabric has a char strength of at least 0.9 Newtons as determined by ASTM Test Method D4032 and exhibits a basis weight loss of no more than 7 wt % when exposed to a gas flame for four minutes (240 seconds). In other embodiments, the flame retardant finished nonwoven fabric can further comprise polyester fiber and still provide the indicated char strength and basis weight burn loss performance. A flame retardant, high char strength finished nonwoven fabric is provided that is cost effective, soft, yet durable and suitable for various end-use applications.

Use of cellulosic fiber fabrics in bedding components is desirable due to the softness and durability associated with the fabrics; however, cellulose fiber tends to be highly flammable and therefore lacks the ability to provide the proper flammability protection often sought out in bedding components. It has been found that acrylic fiber, a fiber not considered inherently flame retardant in the past, can synergize the flame retardant performance of a cellulosic nonwoven fabric finished with flame retardant coating. More particularly, it unexpectedly has been found that the incorporation of acrylic fiber in cellulosic fiber-based flame retardant-finished fabrics in synergistic proportions can provide flame retardant fiber blends that outperform similarly finished cellulosic fabrics that use conventionally-recognized flame retardant inherent fibers, such as modacrylic fiber or other oxygen depleting fibers that are halogenated and/or require copolymerization. In various embodiments, the flame retardant finished nonwoven fabric of the present invention comprises a char strength of at least about 10% greater, and exhibits a basis weight loss of at least about 3% less after exposure to a gas flame for 240 seconds, than the nonwoven fabric with the acrylic fiber replaced by modacrylic fiber. Further, the acrylic/cellulosic fiber blends of the present invention can outperform fiber blends using alternative synthetics such as polyester fiber in place of some of the acrylic fiber. Among other things, the findings of the present invention also show that the flame retardant performance achieved by mere application of flame retardant finish alone to nonwovens leaves significant room for improvement, which improvements can be achieved by incorporating particular fiber combinations that would not be considered inherently flame retardant, in accordance with various embodiments of the present invention.

In various embodiments, flame retardant finished nonwoven fabrics of the invention are substantially or completely free of conventional inherent flame retardant fiber. In some embodiments, the combined acrylic and cellulosic fiber content of the flame retardant finished nonwoven fabric can comprise at least about 75 wt %, or at least about 95 wt %, or at least about 99 wt % and up to about 100 wt % of the total fiber content of the nonwoven fabric. In some embodiments, the combined acrylic and cellulosic fiber content of the flame retardant nonwoven fabric can be halogen-free or essentially halogen-free (e.g., less than about 1 wt % halogen).

In further various embodiments, the flame retardant finished nonwoven fabrics comprising acrylic/cellulosic fiber blends of the present invention can have a char strength preferably of at least 1.0 Newtons as determined by ASTM Test Method D4032, and exhibits a basis weight loss of preferably not more than 6.5 wt %, preferably not more than 6.0 wt %, when exposed to a gas flame for 240 seconds. In other various embodiments, the flame retardant finished nonwoven fabric has a basis weight of at least about 2 osy and no greater than about 7.5 osy, or at least about 2 osy and no greater than about 4.5 osy, or at least about 2.8 osy and no greater than about 3.8 osy. Further yet, in various embodiments the surprisingly good flame retardance obtained with acrylic and cellulosic fiber blends of flame retardant finished nonwoven fabrics in accordance with the present invention can be accomplished without requiring high basis weight web materials, such as, for example, using fabrics having basis weights not exceeding about 4.5 ounces/square yard (osy).

As indicated, the flame retardant finished nonwoven fabric can further comprise polyester fiber in combination with the acrylic and cellulosic fiber content, and still provide similar char strength and basis weight burn loss performance. The flame retardant finished nonwoven fabric can comprise at least about 15 wt % and no greater than about 25 wt % acrylic fiber, at least about 55 wt % and no greater than about 65 wt % cellulosic fiber, and at least about 15 wt % and no greater than about 25 wt % polyester fiber.

The present invention also relates to bedding articles and other upholstered articles including flame retardant finished nonwoven fabrics comprising acrylic/cellulosic fiber blends or acrylic/cellulosic/polyester fiber blends of the present invention. These articles including the flame retardant finished nonwoven fabric can be, for example, mattresses, mattress components, futons, mattress ticking, upholstered articles, and industrial end-use applications, or other uses.

Other features and advantages of the present invention will become readily apparent from the following detailed description, the accompanying drawings, and the appended claims. It is to be understood that both the foregoing general description and the following detailed description are exemplary and explanatory only and are only intended to provide a further explanation of the present invention, as claimed.

DEFINITIONS

Figure 1:
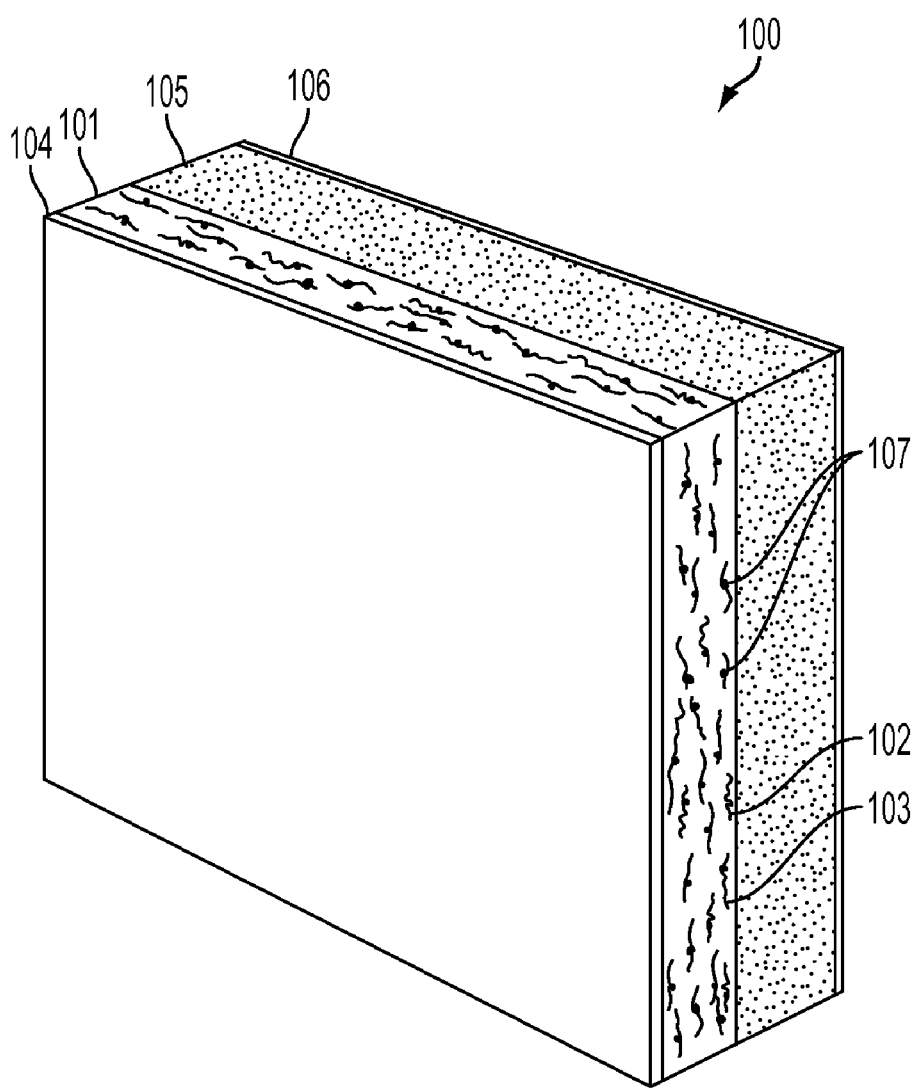
FIG. 1 is a perspective view of a bedding article incorporating a flame retardant finished nonwoven fabric according to an illustrative embodiment of the present invention.

As used herein, an "acrylonitrile unit" comprises the structure:

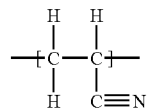

As used herein, "acrylic" refers to a manufactured fiber in which the fiber-forming substance is any long chain synthetic polymer composed of at least 85 percent by weight of acrylonitrile units.

As use herein, "modacrylic" refers to a manufactured fiber in which the fiber-forming substance is any long chain synthetic polymer composed of at less than 85 percent but at least 35 percent by weight of acrylonitrile units.

As used herein, "cellulosic" refers to a manufactured fiber comprising at least about 20% cellulose (i.e., $(C_6H_{10}O_5)_n$) and/or modified cellulosic material. The cellulosic fiber material can be natural, essentially natural ($\geqq$98% natural (non-synthetic)), modified natural, or synthetic, or any combinations thereof.

As used herein, "rayon" or "viscose" or "viscose rayon" refers to a manufactured fiber comprising regenerated cellulose, such as including but not limited to manufactured fibers comprising regenerated cellulose in which substituents have replaced not more than about 15% of the hydrogens of the hydroxyl groups.

As used herein, "polyester" refers to a manufactured fiber in which the fiber-forming substance is any long chain synthetic polymer comprising an ester of a substituted aromatic carboxylic acid, such as including but not limited to any long chain synthetic polymer comprising at least about 85% by weight of an ester of a substituted aromatic carboxylic acid including but not limited to substituted terephthalate units and/or para substituted hydroxy-benzoate units.

As used herein, a "flame retardant" refers to the inhibition or resistance to the spread of fire, and when it modifies "material" or "fabric" refers to a material or fabric that inhibits or resists the spread of fire.

As used herein, "flame retardant finished nonwoven fabric" refers to a nonwoven fabric to which a flame retardant chemical or composition has been topically applied, which makes the treated nonwoven fabric more flame retardant than the untreated or unfinished fibrous substrate or greige good.

As used herein, the term "fiber" generally can refer to continuous filaments, essentially continuous filaments, and discontinuous ("staple") fibers, and other fibrous structures having a length that is substantially greater than its diameter, unless indicated otherwise.

As used herein, a "nonwoven" or "nonwoven web" means a fiber-containing material which is formed without the aid of a textile weaving or knitting process.

As used herein, "melting" refers to the transformation of a fiber or filament, or at least the sheath of the fiber or filament at a temperature or over a range of temperatures within which the fiber or filament becomes sufficiently soft and tacky to cling to other fibers or filaments with which it comes in contact.

As used herein, "comprising" is synonymous with "including," "containing," "having", or "characterized by," and is open-ended and does not exclude additional, unrecited elements or method steps, and thus should be interpreted to mean "including, but not limited to . . . ".

For purposes herein, "consisting essentially of", restricts to the specified materials or steps and those that do not materially affect the basic and novel flame retardant characteristic(s) of the nonwoven fabrics of the invention with respect to char strength as determined by ASTM D4032 Test Method as further described herein and basis weight loss after exposure to a gas flame for 240 seconds as further described herein.

As used herein, "consisting of" excludes any element, step, or ingredient not specified.

DETAILED DESCRIPTION

The present invention relates to cellulosic-based flame retardant finished nonwoven fabrics having enhanced flame retardance by incorporation of acrylic fibers in synergistic proportions. The present inventors have discovered that synergistically flame retardant, relatively lower basis weight nonwoven fabrics can be provided without requiring conventional inherent flame retardant and self-extinguishing fibers, and/or without requiring thick and heavy basis weight nonwoven materials or high loft nonwoven structures. In various embodiments, the flame retardant finished nonwoven fabric of the present invention comprises a char strength of at least about 10% greater, or 15% greater, and exhibits a basis weight loss of at least about 3% less, or 5% less, after exposure to a gas flame for 240 seconds, than the nonwoven fabric with the acrylic fiber replaced by modacrylic fiber. Heavy basis weight nonwoven materials, which can increase cost, bulk, stiffness, and/or entail other drawbacks, can be avoided in flame retardant finished nonwovens according to embodiments of the present invention. Flame retardant finished nonwoven fabrics of the present invention are believed to provide new strategies and/or options for imparting enhanced flame retardance to mattresses and other bedding articles and upholstered articles, and other articles.

It further has been found that a synergized flame retardant performance of flame retardant finished nonwoven fabrics of the present invention is revealed in accelerated open flame burn tests of a certain duration, such as in open gas flame burn tests of approximately four minutes (i.e., 240 seconds). The flame retardant performance of nonwoven fabrics of the present invention in open flame burn tests of approximately four minutes have been found to be predictive of the fabric's performance in a full 30 minute standard mattress burn test (e.g., "TB 603"). By comparison, it also has been found that flame retardant performance of nonwoven fabrics subjected to more abbreviated duration open flame tests (e.g., ≦~12 seconds) yields less reliable results insofar as predicting FR performance of the nonwoven component in a full 30 minute mattress burn test. The high predictability of the four minute open flame test also makes it possible to preliminarily screen a mattress component comprising a candidate nonwoven fabric of interest for flame retardant performance before the necessity of fully assembling a mattress with the component for regulatory flame retardant testing or other standardized flame retardant testing.

In various embodiments, a flame retardant finished nonwoven fabric is provided which comprises at least about 15 wt % and no greater than about 35 wt % acrylic fiber and at least about 65 wt % and not more than about 85 wt % cellulosic fiber, where the nonwoven fabric has a char strength of at least 0.9 Newtons as determined by ASTM Test Method D4032 and exhibits a basis weight loss of no more than 7 wt % when exposed to an open gas flame for four minutes (240 seconds) according to a flammability evaluation standard described herein. In other embodiments, the flame retardant finished nonwoven fabric can further comprise polyester fiber in an amount up to about 25% by weight and preferably up to about 20% by weight of the fabric and still provide the above-indicated char strength and basis weight burn loss. Bedding articles including the flame retardant finished nonwoven fabric are also provided.

FIG. 1 shows a bedding article 100 illustrated as a mattress component in accordance with various embodiments of the present invention. The bedding article 100 includes flame retardant finished nonwoven fabric 101 comprising cellulosic fibers 102 and acrylic fibers 103 as a fibrous blend. The bedding article 100 also includes a ticking layer 104, a foam layer 105, and a quilt backing 106. The fabric 101 includes a flame retardant finish or coating 107. The flame retardant finished nonwoven fabric 101 can be a monolayered or multi-layered fiber material construction. A mattress core of springs or additional foam not shown in FIG. 1, can be further included in the bedding article. In addition, part or all of the mattress component including the flame retardant nonwoven fabric shown in FIG. 1 can be provided on opposite sides of a mattress core, such as springs.

Generally, it is preferable that a bedding material self-extinguishes, and if it does not self-extinguish, it is preferable that it chars instead of melts and/or volatizes (i.e., generates gases as combustion products). A multi-staged (viz., three-staged) thermal degradation pathway for PAN is discussed by Hall et al. with regard to PAN manufacture from acrylic polymer (Hall et al., (1994), "The Flammability of polyacrylonitrile and its copolymers, Polymer degradation and stability," 44, 379-386.) As indicated in the Hall article, as a function of increasing thermal degradation temperature, a virgin acrylic polymer starting material for the production of PAN (i.e., a PAN precursor) can initially volatize or cyclicize at a first stage (Stage I) of thermal degradation, and any cyclicized part is subject to volatization or carbonization at a second (higher temperature) thermal stage of degradation (Stage II), and any remaining carbonized part is further subject to volatization or carbonization at a third (even higher temperature) thermal stage of degradation (Stage III). Typically, the presence of an inert atmosphere and low heat rate can assist in inducing PAN to follow a char (carbonization) forming route over volatization. In addition, small amounts of comonomers (e.g., less than <15% vinyl acetate or methyl acrylate), also have been incorporated into PAN in the past to modify its burn rate and char formation behaviors in oxygen atmospheres.

Based on experimental findings, such as described in the examples infra, it has been found that acrylic fiber can be shifted away from its natural tendency to volatize during thermal degradation in oxygen atmospheres, and instead follow a char forming route. This shift towards more charring behavior instead of volatization can be induced in accordance with embodiments of the present invention under conditions of certain blend proportions with cellulosic fibers and/or flame retardant fabric chemistry, such as exemplified herein. Further, this shift towards charring can be effected without need of comonomer polymer blends, chemical modifications (e.g., halogenation) of the fibers, and/or oxidation (carbonization) of the fibers. Further, the blend of acrylic and cellulosic fibers provided in flame retardant finished nonwoven fabrics can impart enhanced flame retardance and char strength without need of conventionally used flame retardant or self-extinguishing fibers, such as modacrylic, PAN ("oxidized polyacrylonitrile"), melamine, phenolic, aramid, glass, ceramic, graphite, silicon carbide, polytetrafluoroethylene (PTFE), silica modified rayon (e.g., Visil®), and the like. The use of such conventional flame retardant fibers can be reduced or completely eliminated in the flame retardant finished nonwoven fabrics. In some embodiments, for example, the combined acrylic and cellulosic fiber content of the flame retardant nonwoven fabric can comprise at least about 75 wt %, or at least about 80 wt %, or at least about 90 wt %, or at least about 95 wt %, or at least about 98 wt %, or at least about 99 wt %, or at least about 99.5 wt % up to about 100 wt %, based on the total fiber content of the flame retardant finished nonwoven fabric.

Flame performance of flame retardant finished nonwoven fabrics according to the present invention can be evaluated by an exposed flame gas test, char strength, and/or other flammability standards and properties. An exposed gas flame test, referred to as "FT-603FR", can be used for flammability evaluations. FT-603FR applies to mattresses and components that are included in mattresses. In FT-603FR, burn loss or basis weight loss % of a test sample of nonwoven fabric is determined with an open propane gas flame impinged vertically on a face of the tested bedding article (mattress or mattress component) for a four minute (240 second) period. Additional details of the FT-603FR are set forth in the examples section herein. The test results for FT-603FR correlate to and are predictive of test results by California Technical Bulletin 603 (TB-603)(e.g., good performance on FT-603FR correlates to favorable TB-603 results; poor performance on FT-603FR correlates to unfavorable TB-603 results). Char strength of the flame retardant finished nonwoven fabrics can be determined, for example, by ASTM Test Method D4032 (1992), such as described in the examples section herein.

In various preferred embodiments, the flame retardant finished nonwoven fabrics comprising acrylic/cellulosic fiber blends of the present invention can have a char strength of at least 0.9 Newtons, as determined by ASTM Test Method D4032, and exhibits a basis weight loss of no more than 6.5 wt % and preferably not more than 6 wt %, when exposed to a gas flame for 240 seconds such as in accordance with FT-603FR. In other further embodiments, the flame retardant finished nonwoven fabrics and bedding articles incorporating the flame retardant finished nonwoven fabrics of the present invention can comply with Technical Bulletin 603 of the State of California Department of Consumer Affairs ("TB-603") and/or 16 C.F.R. §1633. For example, mattresses including a flame retardant finished nonwoven fabric of the present invention can have a peak heat release rate not exceeding 200 kilowatts (kW) within the 30 minutes of test in accordance with TB-603, and the total energy released is no more than 15 megajoules (MJ) for the first 10 minutes of the test in accordance with TB-603. In additional embodiments, the flame retardant nonwoven fabrics and bedclothing incorporating the flame retardant nonwoven fabrics of the present invention can comply with draft Technical Bulletin 604 of the State of California Department of Consumer Affairs ("TB-604") and/or proposed 16 C.F.R. §1634.

The surprisingly enhanced flame performance obtained with acrylic and cellulosic fiber blends in accordance with the present invention can be accomplished without requiring high basis weight nonwoven materials. In other various embodiments, the flame retardant finished nonwoven fabric has a basis weight of at least about 2 osy and no greater than about 7.5 osy, or at least about 2 osy and no greater than about 4.5 osy, or at least about 2.5 and no greater than about 4.2 ounces/square yard, or at least about 2.8 and no greater than about 3.8 ounces/square yard. In other various embodiments, the greige nonwoven fabrics used in the flame retardant finished nonwoven fabrics have a greige basis weight of at least about 1.8 and no greater than about 7.0 ounces/square yard, or at least about 1.8 and no greater than about 4.0 ounces/square yard, or at least about 2.3 and no greater than about 3.8 ounces/square yard, or at least about 2.5 and no greater than about 3.6 ounces/square yard.

The flame retardant finished nonwoven fabrics of the present invention can comprise at least a combination of acrylic and cellulosic fibers. Although inclusion of other types of fibers is not categorically excluded, other types of fibers also are not needed in order to achieve the unexpectedly good flame retardance properties of the flame retardant finished nonwoven fabrics of the present invention. In various embodiments, the flame retardant finished nonwoven fabrics in this respect can comprise, for example, at least about 15 wt % and no greater than about 35 wt % acrylic fiber and at least about 65 wt % and no greater than about 85 wt % cellulosic fiber, or at least about 18 wt % and no greater than about 32 wt %. acrylic fiber and at least about 68 wt % and no greater than about 82 wt % cellulosic fiber, or at least about 20 wt % and no greater than about 30 wt % acrylic fiber and at least about 70 wt % and no greater than about 80 wt % cellulosic fiber. In other various embodiments, cellulosic, acrylic, and polyester fiber blends can be used for the nonwoven fabric construction. The flame retardant finished nonwoven fabrics in this respect can comprise, for example, at least about 15 wt % and no greater than about 25 wt % acrylic fiber, at least about 55 wt % and no greater than about 65 wt % cellulosic fiber, and at least about 15 wt % and no greater than about 25 wt % polyester fiber; or at least about 18 wt % and no greater than about 22 wt % acrylic fiber, at least about 52 wt % and no greater than about 62 wt % cellulosic fiber, and at least about 18 wt % and no greater than about 22 wt % polyester fiber. In some embodiments, the combined fiber content per se of the flame retardant finished nonwoven fabric can be halogen-free or essentially halogen-free. In some embodiments, the entire combined fiber content per se of the flame retardant finished nonwoven fabric can contain less than about 2 wt % halogen, or less than about 1 wt % halogen, or less than 0.5 wt % halogen, or less than about 0.1 wt % halogen, based on the total fiber weight of the flame retardant finished nonwoven fabric.

The fibers of the nonwoven fabrics of various embodiments of the present invention can be staple length, continuous, essentially continuous, or combinations thereof. The fibers can be used as raw virgin fiber material or as a finished fiber. The finished fibers can be fibers contacted with a finish material at a surface thereof before use in fiber blending and web formation. The fiber finish may include those conventionally used, such as a fiber finish comprising a lubricant, antistatic agent, shrinkage control agent, and so forth. In various embodiments of the present invention, the fibers have (receive) a flame retardant topical finish, such as described herein.

The cellulosic fiber can be natural and/or synthetic in origin. The cellulosic fiber can be selected, for example, from the group consisting of (viscose) rayon, wood pulp, lyocell, cotton, jute, ramie, bamboo, and any combinations thereof. The cellulosic fiber can be inorganic modifier-free or essentially inorganic modifier-free. An inorganic modifier refers to materials, such as silica, aluminosilicate, and so forth, which can affect the flame retardant properties of the cellulose. The cellulosic fiber can contain, for example, less than about 2 wt % inorganic modifier, or less than about 1 wt % inorganic modifier, or less than about 0.5 wt % inorganic modifier, or less than about 0.1 wt % inorganic modifier, based on the total cellulosic fiber weight. The cellulosic fiber can be halogen-free or essentially halogen-free. The cellulosic fiber can contain, for example, less than about 2 wt % halogen, or less than about 1 wt % halogen, or less than about 0.5 wt % halogen, or less than about 0.1 wt % halogen, based on the total cellulosic fiber weight.

As indicated, the acrylic fiber can be a manufactured fiber in which the fiber-forming substance is any long chain synthetic polymer composed of at least 85 percent by weight of acrylonitrile units. In some embodiments, the acrylic fiber can be composed of at least 88 wt %, or at least 90 wt %, or at least 92 wt %, or at least 94 wt %, or at least 95 wt %, or at least 96 wt %, or at least 97 wt %, or at least 98 wt %, or at least 99 wt %, or at least 99.5 wt % up to 100 wt % acrylonitrile units, based on total acrylic fiber weight. In some embodiments, the acrylic fiber can be, for example, virgin PAN precursor or non-carbonized PAN precursor (i.e., a precursor with no Stage II transformation such as described by Hall et al., which is referenced elsewhere herein). In some embodiments, the acrylic fiber can be at least 95% non-carbonized, or at least 98% non-carbonized, or at least 99% non-carbonized, or at least 99.5% non-carbonized up to 100% non-carbonized. In some embodiments, the acrylic fiber can contain less than about 15 wt % total flame retardant-making comonomer, or less than about 10 wt % total flame retardant-making comonomer, or less than about 5 wt % total flame retardant-making comonomer, or less than about 1 wt % total flame retardant-making comonomer, based on the total acrylic fiber weight. Flame retardant-making comonomers can, but not necessarily, contain a vinyl group(s). The flame retardant-making comonomer can refer to, for example, vinyl acetate, vinyl chloride, vinylidene chloride, (meth)acrylate, methylmethacrylate, (meth)acrylic acid, itaconic acid, and the like and any combinations thereof. In some embodiments, the acrylic fiber can be halogen-free or essentially halogen-free. The acrylic fiber can contain, for example, less than about 2 wt % halogen, or less than about 1 wt % halogen, or less than about 0.5 wt % halogen, or less than about 0.1 wt % halogen, based on the total acrylic fiber weight.

The fiber length and diameter of the fibers used in flame retardant finished nonwoven fabrics of the present invention, such as the acrylic fiber, cellulosic fiber, and any other fiber types, can be selected to suit a particular end-use application. Staple fiber lengths can be, for example, about 1 mm to about 50 mm, or about 3 mm to about 30 mm, or about 5 mm to about 20 mm, or about 10 mm to about 15 mm, or other fiber lengths also may be useful. Staple fiber diameters may range, for example, from about 5 microns to about 10,000 microns, or from about 10 microns to about 5,000 microns, or from about 20 microns to about 2,000 microns, or other fiber diameters also may be useful. Filaments can be used, for example, in deniers from about 0.5 to about 10, or about 1.5 to about 5, or about 2 to about 3.5, or other denier values also may be useful.

The nonwoven fabric substrate or greige material of the present invention can comprise meltblown, spunbond, spunlaid, SMS (spunbond-meltblown-spunbond), coform, airlaid, wetlaid, carded webs, thermal bonded, through-air-bonded, thermoformed, spunlace, hydroentangled, needled, chemically bonded, or any combinations thereof.

The fiber blends including combinations of at least cellulosic and acrylic fibers can be processed into a nonwoven web, for example, using or by adapting general processes and equipment layouts. For example, the combinations of cellulosic and acrylic fibers, in the desired mixing proportions such as described herein, can be carded and optionally cross-lapped to form a nonwoven precursor web. The fiber blends can be used to form a nonwoven comprised of a single or multiple batts (e.g., two, three, four, or five batts, etc.) using batt forming techniques and equipment including those conventional in the industry. In one embodiment, the precursor web can comprise 100% cross-lap fibers, that is, all of the fibers of the web have been formed by cross-lapping a carded web so that the fibers are oriented at an angle relative to the machine direction of the resultant web. The precursor web can have, for example, a draft ratio of 2.0 to 1 to 3.0 to 1, or other ratios. U.S. Pat. No. 5,475,903, hereby incorporated by reference, illustrates a web drafting apparatus that can be used. Other known web drafting devices also can be used. The nonwoven precursor web can be hydroentangled to consolidate or further consolidate the web. Optionally, the precursor web can be further entangled on a foraminous surface, including, but not limited to a three-dimensional image transfer device, embossed screen, three-dimensionally surfaced belt, or perforated drum, suitably further enhancing the functionality and/or aesthetic quality of the fabric surface(s) for a particular end-use application. Techniques for processing the fiber blends to form batts and nonwovens are described, for example, in U.S. Pat. Nos. 7,188,397 B2, 6,502,288, 6,596, 658, 3,485,706, and U.S. Pat. Application Publication No. 2005/0215158 A1, which references are incorporated herein by reference in their entireties.

Figure 2:
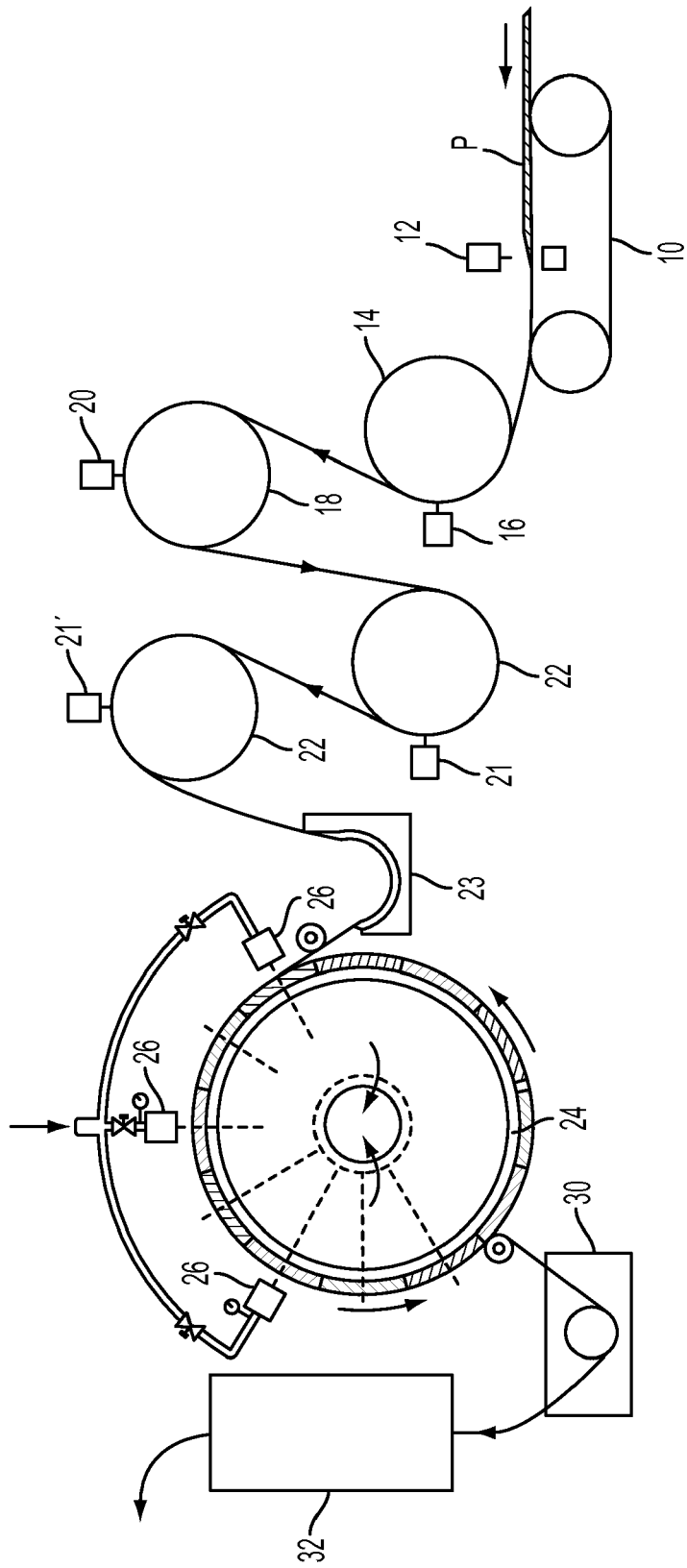
FIG. 2 a diagrammatic view of an apparatus for manufacturing a nonwoven fabric according to an embodiment of the present invention.

With reference to FIG. 2, an exemplary apparatus is illustrated for forming a nonwoven fabric of embodiments of the present invention. The fabric is formed from a fibrous matrix comprising a blend of fibers according to embodiments of the present invention. The fibrous matrix is preferably carded and cross-lapped to form a precursor web, designated P. The apparatus of FIG. 2 includes a foraminous forming surface in the form of belt 10 upon which the precursor web P is positioned for pre-entangling by entangling manifold 12. Pre-entangling of the precursor web, prior to imaging and patterning, is subsequently effected by movement of the web P sequentially over a drum 14 having a foraminous forming surface, with entangling manifold 16 effecting entanglement of the web. Further entanglement of the web is effected on the foraminous forming surface of a drum 18 by entanglement manifold 20, with the web subsequently passed over successive foraminous drums 20, for successive entangling treatment by entangling manifolds 21, 21'. The entangling apparatus of FIG. 2 further includes an imaging and patterning drum 24 comprising a three-dimensional image transfer device for effecting imaging and patterning of the now-entangled precursor web. The image transfer device includes a moveable imaging surface which moves relative to a plurality of entangling manifolds 26 which act in cooperation with three-dimensional elements defined by the imaging surface of the image transfer device to effect imaging and patterning of the fabric being formed. The precursor web P be advanced onto the moveable imaging surface of the image transfer device at a rate which is substantially equal to the rate of movement of the imaging surface. As illustrated in FIG. 2, a J-box or scray 23 can be employed for supporting the precursor web P as it is advanced onto the image transfer device to thereby minimize tension within the precursor web. Instead of, or in addition to J-box 23, a driven web roll can be employed for advancing the web P onto the imaging surface of the drum 24 while substantially eliminating tension in the webs. By controlling the rate of advancement of the precursor web onto the imaging surface to minimize, or substantially eliminate, tension within the web, enhanced hydroentanglement of the precursor web is desirably effected. Hydroentanglement results in portions of the precursor web being displaced from on top of the three-dimensional surface elements of the imaging surface to form an imaged and patterned nonwoven fabric. Enhanced Z-direction entanglement is desirably achieved, thus providing improved imaging and patterning, and enhanced physical properties for the resultant fabric.

A flame retardant coating is topically coated onto the greige material to provide a flame retardant finished nonwoven fabric. The greige material can be a hydroentangled nonwoven fabric or non-hydroentangled nonwoven fabric comprising a fiber blend according to embodiments of the present invention. The application of the fire retardant coating typically follows any hydroentanglement performed on the nonwoven. In various embodiments, the flame retardant coating or finish can be sprayed, padded, roll-coated, or otherwise topically coated onto one or both surfaces of the nonwoven web. The flame retardant coating can be, for example, substantially uniformly applied to one or both faces of the fabric. The flame retardant coating can be a full impregnation coat, which entirely or substantially entirely contacts fibrous portions of the nonwoven through its entire thickness. Alternatively, the flame retardant coating can be applied to only partially penetrate through the thickness of the nonwoven. For example, fibrous portions at the outer surface or surfaces of the nonwoven can become contacted with the flame retardant coating treatment, but not necessarily all interior bulk portions thereof. In various embodiments, production scale equipment that is commercially available can be used or readily adapted for applying the fire retardant compositions to the greige fabrics. In one embodiment, for example, a Kuesters unit, such as one used a 222.52 finishing pad, can be used in this respect. Other conventional or suitable coating devices and equipment for applying a flame retardant composition to a nonwoven fabric also can be used.

The flame retardant coating composition or finish applied to the greige nonwoven fabric can comprise, for example, a flame retardant agent, a binder, and/or other additives commonly used in such flame retardant finishes. The flame retardant finish can be, for example, an aqueous mixture of flame retardant non-halogenated salts (e.g., phosphorus, sulfur, boric, etc.), with binders (e.g., poly(alkyl)acrylic acids and/or esters thereof (poly(alkyl)acrylates), polyvinyl acetates, ethylene vinyl acetates, etc.) that are suitably salt stable, colorants that are suitably salt stable (e.g., pigments, dyestuffs, etc.), surfactants (e.g., alkyl phosphate and alcohol ethoxylates, etc.), and defoamers (e.g., non-silicone defoamers such as mineral oil and fatty amides, etc.). These components can be added separately or in any combinations thereof to provide a single mixture. The reference to poly(alkyl)acrylic acids or esters thereof can refer to chemistries having a —COOH group, or an ester group (—COOR) in the case of acrylates. The major components of the acrylic binders in one embodiment can be, for example, ethylacrylate and/or butylacrylate, and these monomers can be polymerized together with acrylic acid to make an acrylic binder. Acrylonitrile, optionally, may be added, such as for solvent resistance. For example, in one non-limiting binder formulation a ratio of 93 parts ethylacrylate, 5 parts acrlylonitile, and 2 parts acrylic acid, is provided. The acrylonitrile, if included in the acrylic binders, can be, for example, a block monomer between blocks of the alkylacrylate. In one example, the acrylic binders contain less than 20 wt %, or less than 10 wt %, or less than 5 wt %, or less than 1 wt %, or from 0-10 wt %, acrylonitrile units, from all acrylic binder sources therein, based on total binder weight. Further, the acrylic binders also can contain nitrogen as amino, ureido, or imido, etc., functionalities. The flame retardant agent can be, for example, non-halogenated ammoniated salts such as ammonium polyphosphate and ammonium sulfamate. The flame retardant agent also can be non-halogenated phosphate esters, borates such as boric acid, zinc borate or borax, inorganic hydroxides such as aluminum or magnesium hydroxide, aluminum trihydrate, antimony compounds, and silica or silicates, or any combinations thereof. In various embodiments, the flame retardant coating can comprise, for example, about 5 wt % to about 30 wt % phosphate salt, about 1 wt % to about 6 wt % binder, about 0.01 wt % to about 0.5 wt % pigment or colorant, about 0.01 wt % to about 1 wt % surfactant, and about 0.01 wt % to about 0.1 wt % defoamer, all on a solids basis. In some embodiments, the flame retardant coating or finish can be halogen-free or essentially halogen-free. The flame retardant coating can contain, for example, less than about 2 wt % halogen, or less than about 1 wt % halogen, or less than about 0.5 wt % halogen, or less than about 0.1 wt % halogen, based on the total flame retardant coating weight. To formulate the flame retardant coating, the active agent(s) and other solids of the flame retardant coating can, for example, be dispersed, dissolved, slurried or the like in a carrier that can be evaporated from the nonwoven, such an aqueous solution and/or volatile organic solvent.

The flame retardant coating composition is preferably applied to the greige fabric at a total solids add-on rate on a dry weight percentage basis of up to about 20%, or about 1 to about 18%, or about 3 to about 15%, or about 4% to about 13%, or about 5% to about 10%, based on the ratio of added coating weight (solids basis) to total weight of fiber. These add-on rate percentages refer to the amount of solid (dry) chemical added to the fabric. For example, a greige fabric having a basis weight of 3.0 osy, which has a basis weight increased to 3.3 osy after being finished with a flame retardant coating, has a 10 wt % add-on rate for finish.

As indicated, the flame retardant finished nonwoven fabrics of various embodiments of the present invention can be used, for example, in bedding articles and other upholstered articles including flame retardant finished nonwoven fabrics comprising acrylic/cellulosic fiber blends. The present invention also relates to these articles that incorporate the nonwoven fabrics. These articles including the flame retardant finished nonwoven fabric can be, for example, mattresses (e.g., mattresses for beds, futons, day beds, trundle beds, bunk beds, cribs, convertible sofa beds, roll-away beds, upholstered water beds, upholstered air mattresses, sleeper chairs, flip chairs, high risers, corner groups, etc.), and mattress components (e.g., mattress ticking, mattress foundation, mattress ticking, etc.). The articles also can be upholstered articles, such as upholstered furniture. Other home and industrial end-use applications also can apply.

The present invention will be further clarified by the following examples, which are intended to be exemplary of the present invention. Unless indicated otherwise, all amounts, percentages, ratios and the like used herein are by weight.

EXAMPLES

Standard Test Protocols

A. Flammability Test ("FT-603FR"): The purpose of the flammability test is to determine the resistance of a nonwoven fabric sample to flame by measuring total weight loss of fabric and foam when exposed to a gas flame for 4.0 minutes (240 seconds).

Equipment. The equipment that can be used in the test method includes the following: a metal sample jig (6 inch×6 inch) in two parts with pegs and pins, a gas pressure regulator and gauge; a mounting stand; a balance having capacity of at least 100 grams and a resolution of 0.10 gram; a ruler to measure fabric sample dimensions; a liquid propane (LP) gas supply that is at least 97 percent pure with a pressure-reducing valve and gauge to allow maintenance of a pressure of 2.5 lb/in$^2$ (psi)+/−0.25 psi; a stopwatch/timer for timing the flame time; a spray bottle of tap water in case of foam ignition; and test foam is 2 inch thick with 2.5 lb density and 38 lb.+/−5 lb. compression. The foam can be obtained, for example, from J&L Fabrics Style XL2538 Supreme as part number JSU 2538-2R. The test foam also can be substituted with 4 inch foam (part number is JSU 2538 490) that is cut to 2 inch thickness.

Test Method. The following sample preparations, testing procedures, and calculations are used.

Sample Preparation. The fabric sample is prepared as follows: (1) cut one fabric sample 6 inch×6 inch (+/−0.25 in.), (2) cut one piece of 2-inch thick foam 5 in.×5 in.(+/−0.25 in.), (3) number, weigh and record to the nearest 0.10 gram the weight of the fabric alone, and (4) add foam, weigh and record total weight of fabric and foam. A one inch difference in size between the foam and the fabric simplifies assembly of the sample jig. Fabric samples are flame tested as a single unfolded ply.

Test Procedure. The test procedure includes the following steps: (1) turn on gas supply, adjust gas flow pressure to set flame height to mark (4.0 in.+/−0.25 in.) to provide about a 1.0 inch of flame into sample jig. The pressure gauge should read about 0.4 standard cubic feet per hour (SCFH); (2) place a fabric sample on the bottom of the jig; (3) place the foam on top of the fabric sample; (4) place the top of the jig over the jig assembly; (5) tighten wing nuts to compress foam to space height; (5) place the sample assembly on the ring stand; (6) swivel the ring stand to where flame strikes the hole in the bottom of the jig assembly; (7) start timer and observe timer and/or burner for 4.0 minutes (240 seconds); (8) after the 4 minute time is reached, swivel the sample jig out of the flame. The flame is positioned with respect to the foam and fabric such that the flame touches the fabric and not the foam. If running tests repeatedly, the jig is chilled in water after each test. An exhaust fan can be used during the test.

Calculations. The basis weight loss of fabric is calculated as follows: (1) remove pins from pegs, remove top of jig, and remove foam and fabric sample from bottom of jig; (2) weigh the foam and fabric together on scale to the nearest 0.10 gram, including in the weight any burned residue; (3) calculate the percent weight loss as follows: 100×(W1−W2)/W1=% weight loss, where W1=weight foam and fabric before test, and W2=weight form and fabric after test. The percent weight loss is recorded. If the flame penetrated the fabric sample and ignited the foam before time was reached, the sample is recorded as failing. Where the weight loss of the foam and fabric exceeds 40 wt %, the sample is recorded as failing.

B. Char Strength. Char strength is determined by ASTM Test Method D4032 (1992), entitled "Standard Test Method For Stiffness Of Fabric By The Circular Bend Procedure." This test method was used to determine the char strength of nonwoven fabric rather than determine stiffness. The char strength test is measure of the stiffness of the nonwoven fabric after flame treatment. The fabric stiffness tester device used is a model no. SASD-672, as manufactured by J.A. King, which has a digital type gage and pneumatic actuator. To measure char strength, a fabric sample is taken directly from the FT-603FR test. The 6"×6" fabric samples are first charred in accordance with FT-603FR. As a result, the samples have a 2" diameter charred area located in the middle of the sample. The charred sample is removed from the foam that is utilized as part of the FT-603FR test and then subjected to the conditioning and test procedures set forth in the ASTM standard. A specimen marking template and sample numbering/preparation, and use of a stop watch for checking plunger stroke speed, as mentioned in the ASTM standard, are not used. Fabric samples are tested as a single unfolded ply. As to other char strength test conditions used, the air pressure is 47 psi, the plunger speed is 1.7 seconds, and clearance under the plunger is ⅛ inch (0.125 inch). The compression peak is measured in Newtons.

Example 1

Flame performance in terms of char strength and basis weight loss percentage was determined for samples of flame retardant finished nonwoven fabrics comprising different combinations and amounts of rayon, acrylic, modacrylic, and/or polyester fibers, using the testing protocols indicated herein.

The acrylic fiber was obtained under the product name Texlan BRFEV from That Acrylic (staple length 38 mm, denier 1.5, $T_g$=85-87° C.). The rayon fiber was obtained under the product name LG from Nanjing Lenzing (staple length 38 mm, denier 1.5). The modacrylic fiber was obtained under the product name FHB from Vmod (staple length 38 mm, denier 1.5, $T_g$=87.5° C. (DSC transition peak)). The polyester fiber was obtained under the product name 20NW from DAK (staple length 38 mm, denier 1.54, $T_g$=70° C.).

The samples of nonwoven fabrics were prepared as carded and crosslapped nonwoven webs using a similar process to provide greige materials. The process used to prepare the nonwoven fabric samples from the respective constituent fibers included carding and crosslapping of the staple fibers arranged in three batts, wherein two of the three batts are crosslapped. The carded and crosslapped materials were hydroentangled and image-patterned by using a series of entangling manifolds and patterning drum such as diagrammatically illustrated in FIG. 2. Each of the entangling manifolds (12, 16, 20, 21, 21') included 120 micron orifices spaced at 42.3 per inch, with the manifolds successively operated at 50, 100, 125, 125, and 125 bar, respectively, with a line speed of 45 yards per minute. A web having a width of 72 inches was employed. The entangling apparatus of FIG. 2 further includes an imaging and patterning drum 24 comprising a three-dimensional image transfer device for effecting imaging and patterning of the now-entangled precursor web. The entangling apparatus includes a plurality of entangling manifolds 26, which act in cooperation with the three-dimensional image transfer device of drum 24 to effect patterning of the fabric. In the present example, the entangling manifolds 26 were successively operated at 120, 170, and 170 bar, at a line speed which was the same as that used during pre-entanglement. The three-dimensional image transfer device of drum 24 was configured as a so-called tricot or octagon/squares pattern. These particular patterns are not considered to impact or more than nominally impact the FR performance of the fabric. The basis weights (dry) of the resulting greige materials were determined.

Subsequent to patterned hydroentanglement, the fabrics received a substantially uniform application of a fire retardant composition (finish), such as exemplified as at application station 30 in FIG. 2. The greige materials were treated by padding them on via dip and nip with a flame retardant composition. In this respect, a laboratory scale coating apparatus was used for padding the finish on the fabric samples. The coating apparatus was a Mathis HVF-34693 padder. The padder was used with operating conditions of 3.2-4.0 bar pressure and a speed at 10 meters/minute. The fabric was immersed in the finish bath, and fed into the nip of the pad at these settings. The finish treated fabric was caught at the exit of the pad and fastened onto a pin frame on an Ahiba lab oven set at 1.5 minute dwell time and 160° C. temperature. The drying station is generally indicated as station 32 in FIG. 2. The fire retardant composition formulation, by weight percent, was a grey finish comprising ammonium polyphosphate (approx. 23 wt % (wet)), acrylic binder (approx. 4 wt % (wet)), pigment, surfactant, non-silicone defoamer, pigment disperser, and water as diluent. The wet pick-up rate of the finish on the fabric was approximately 120%. Table I below provides non-limiting exemplary additional details on the formulation of the fire retardant finish that was used. The % solids of each ingredient source, the total % ingredient based on total weight of the coating bath ("owb"), the % ingredient solids based on total bath solids, and % dry pick-up (% dpu, i.e., % ingredient solids based on the overall bath composition weight).

TABLE I

| Chemical | RM | Description | % solids source | % owb | % ingredient solids based on total bath solids | % dpu |
|---|---|---|---|---|---|---|
| Water | | Diluent | 0 | 71.82 | 0.00 | 0.00 |
| RUCOWET FN BASE[1] | 13-3913 | Surfactant | 30 | 0.50 | 1.25 | 0.15 |
| CONPAD AUX 2174 | 10-3654 | acrylic binder | 50 | 4.40 | 18.25 | 2.20 |
| AQUABLAK 6456[2] | 12-2706 | Pigment | 30.5 | 0.08 | 0.20 | 0.02 |
| GTI TARD FFR2 | 13-2329 | Flame retardant | 42 | 23.00 | 80.14 | 9.66 |
| AIRONIL 5519 | 13-3985 | Defoamer | 98.5 | 0.02 | 0.16 | 0.02 |
| NEW TOTALS | | | | | 100 | 12.05 |

[1]Rudolph GmbH, Germany.
[2]Solutions Dispersions.

The source of flame retardant can be changed. For example, PEKOFLAM HSD (Clariant) or FR 278U6, or other commercial sources of fire retardant also can be used. To impart a different color to the FR finish, different pigments can be used, such as CHROMA BEIGE 4722 for providing a beige colored finish, or other commercial pigments for that or different desired color. The basis weights of the finished samples (dry basis) were determined.

The char strengths and burn loss weight percentage were determined for the fire retardant finished samples using the applicable testing protocols described herein. The char strengths and burn loss results for the tested samples are provided in Table 1 and plotted in FIGS. 3-7. Table 1 also includes the greige and finished (fire retardant coated) dry basis weights of the samples.

TABLE 1

| Sample No. | Sample ID | FT-603FR (wt %) | Char Strength (N) | Basis Wt Finished (osy) | Basis Wt Greige (osy) | Fiber Blend (wt/wt) or(wt/wt/wt) |
|---|---|---|---|---|---|---|
| 1 | HH894p | 6.5 | 0.84 | 3.3 | 3.0 | 70% Rayon/30% PET |
| 2 | HH916p | 6.5 | 0.58 | 3.4 | 2.7 | 60% Rayon/40% PET |
| 3 | HH917p | 6.8 | 0.87 | 3.0 | 2.8 | 80% Rayon/20% PET |
| 4 | HH874p | 5.9 | 0.80 | 3.0 | 2.6 | 60% Rayon/20% PET/20% Acrylic |
| 5 | HH726/4p | 5.5 | 0.90 | 3.4 | 3.0 | 60% Rayon/20% PET/20% Acrylic |
| 6 | HH879p | 6.2 | 1.09 | 3.4 | 3.2 | 70% Rayon/30% Acrylic |
| 7 | HH891p | 5.2 | 0.86 | 3.0 | 2.6 | 70% Rayon 30% Acrylic |
| 8 | HH898p | 6.3 | 0.82 | 3.3 | 3.0 | 90% Rayon/10% Acrylic |
| 9 | HH899p | 5.4 | 0.77 | 3.5 | 3.3 | 50% Rayon/50% Acrylic |
| 10 | HH900p | 5.1 | 0.68 | 3.5 | 2.9 | 25% Rayon/75% Acrylic |
| 11 | HH913p | 5.9 | 0.82 | 2.9 | 2.6 | 60% Rayon/40% Acrylic |
| 12 | HH915p | 5.5 | 1.25 | 3.1 | 2.8 | 80% Rayon/20% Acrylic |
| 13 | HH910p | 5.3 | 0.74 | 3.0 | 2.5 | 60% Rayon/20% Modacrylic/20% PET |
| 14 | HH911p | 6.8 | 0.76 | 3.1 | 2.7 | 70% Rayon/30% Modacrylic |
| 15 | HH912p | 6.8 | 1.03 | 3.1 | 2.7 | 60% Rayon/40% Modacrylic |
| 16 | HH914p | 5.7 | 1.02 | 3.0 | 2.7 | 80% Rayon/20% Modacrylic |

Figure 3:
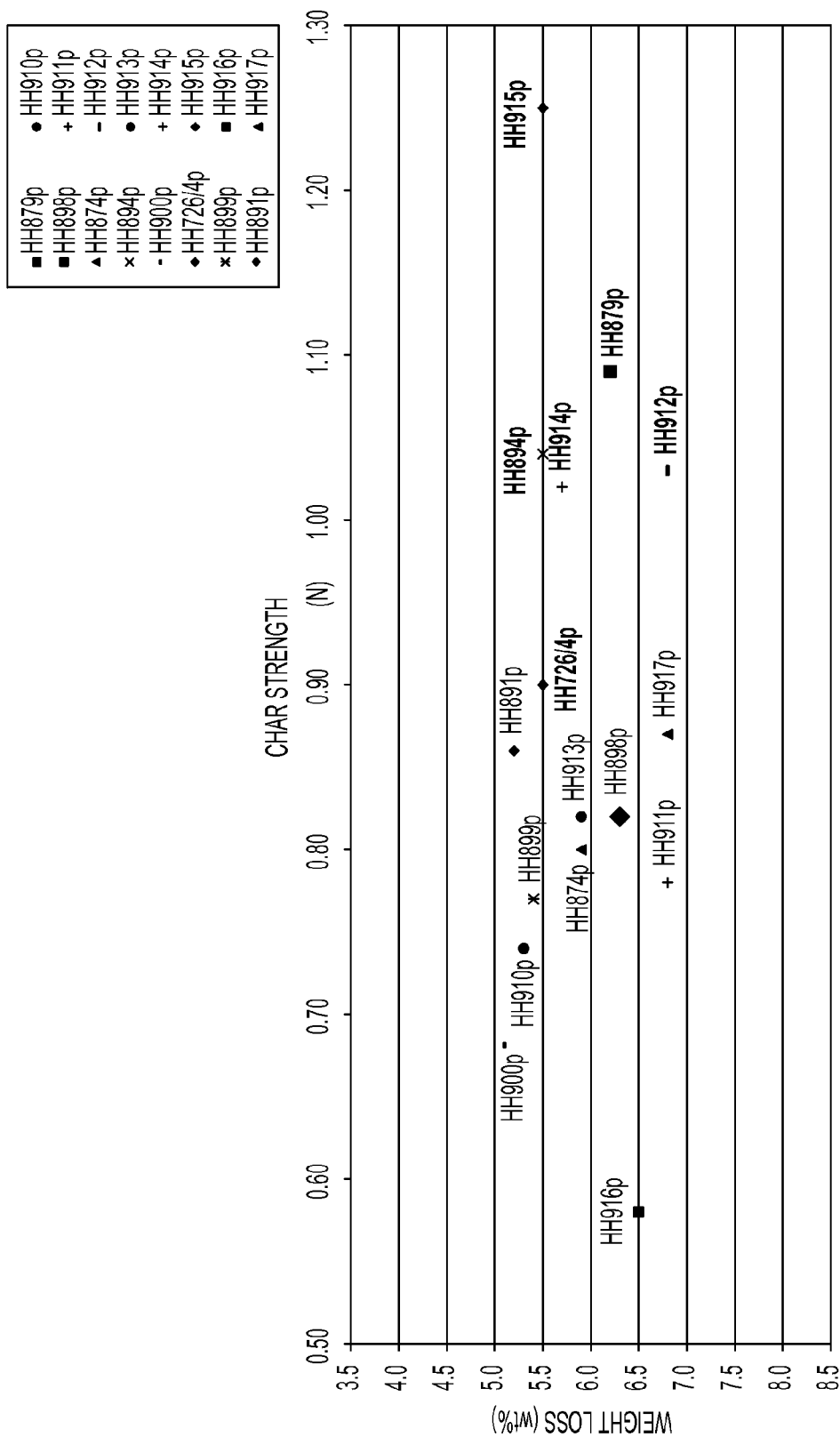
FIG. 3 is a plot showing the flame retardant performance with respect to char strength and basis weight loss for samples of flame retardant finished nonwoven fabrics comprising different combinations and amounts of rayon, acrylic, modacrylic, and/or polyester fibers.
Figure 4:
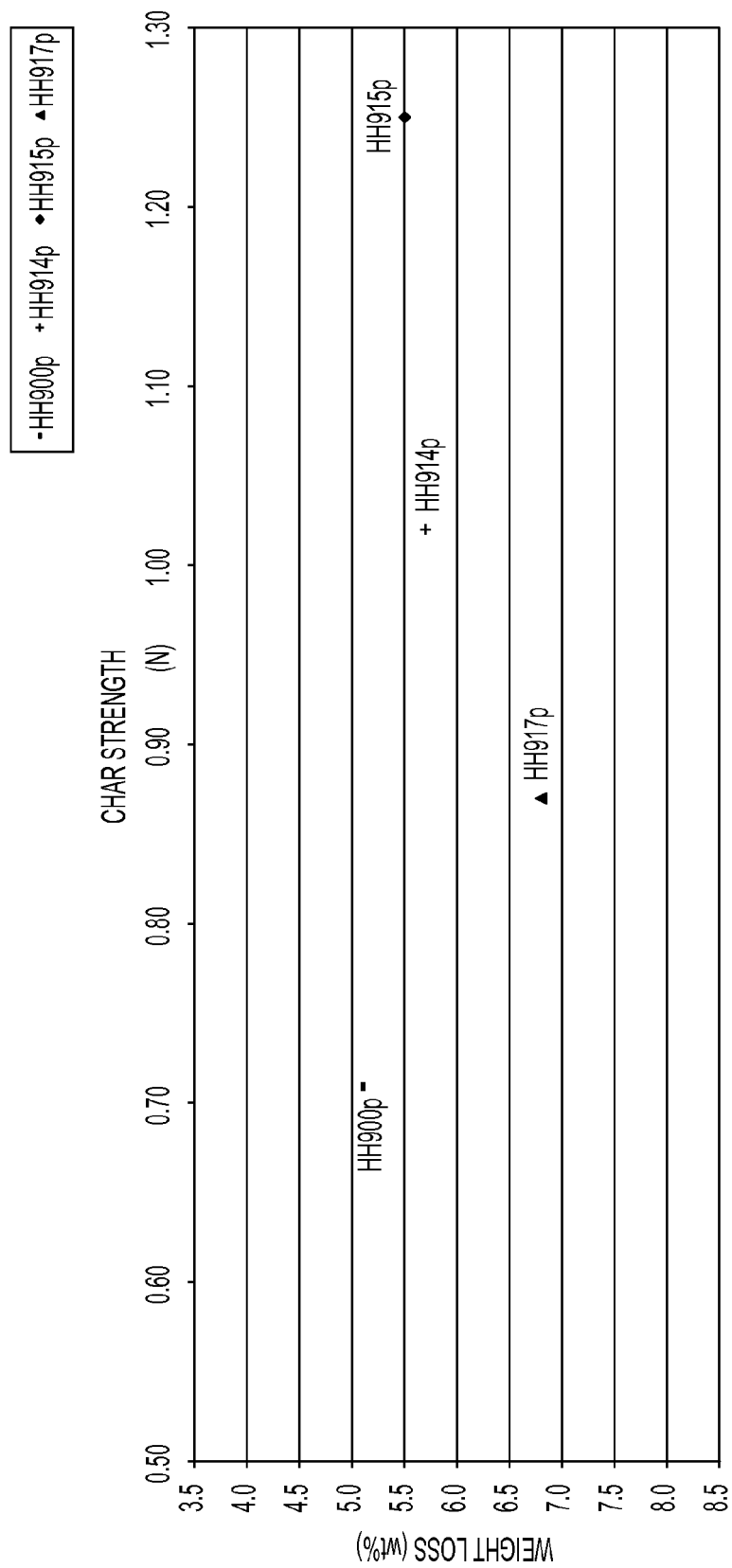
FIG. 4 is a plot showing the flame retardant performance with respect to char strength and basis weight loss percentage for samples of nonwoven fabrics shown in FIG. 1 where the nonwoven fabrics comprise 80/20 wt/wt combinations of rayon and one of acrylic, modacrylic, or polyester fibers.
Figure 5:
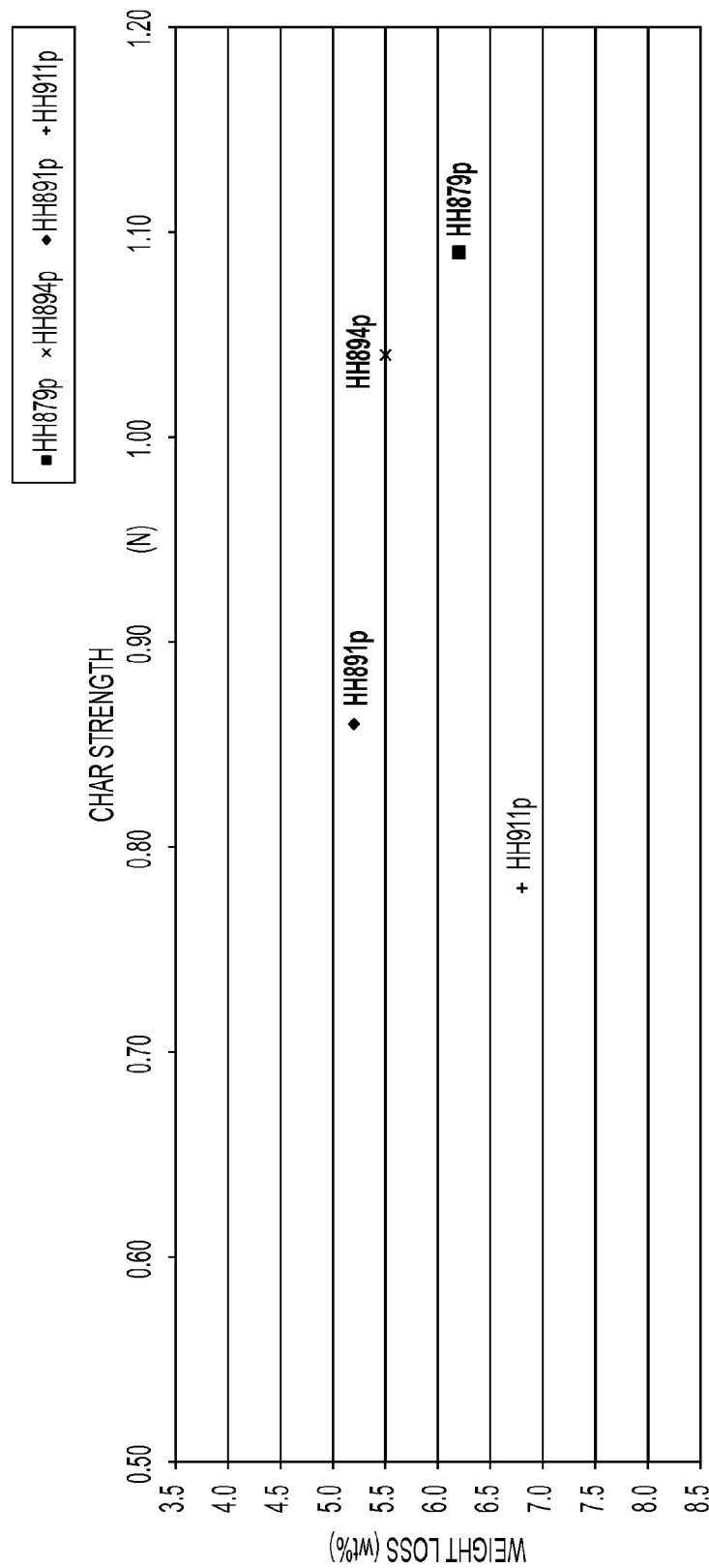
FIG. 5 is a plot showing the flame retardant performance with respect to char strength and basis weight loss percentage for samples of nonwoven fabrics shown in FIG. 1 where the nonwoven fabrics comprise 70/30 wt/wt combinations of rayon and one of acrylic, modacrylic, or polyester fibers.
Figure 6:
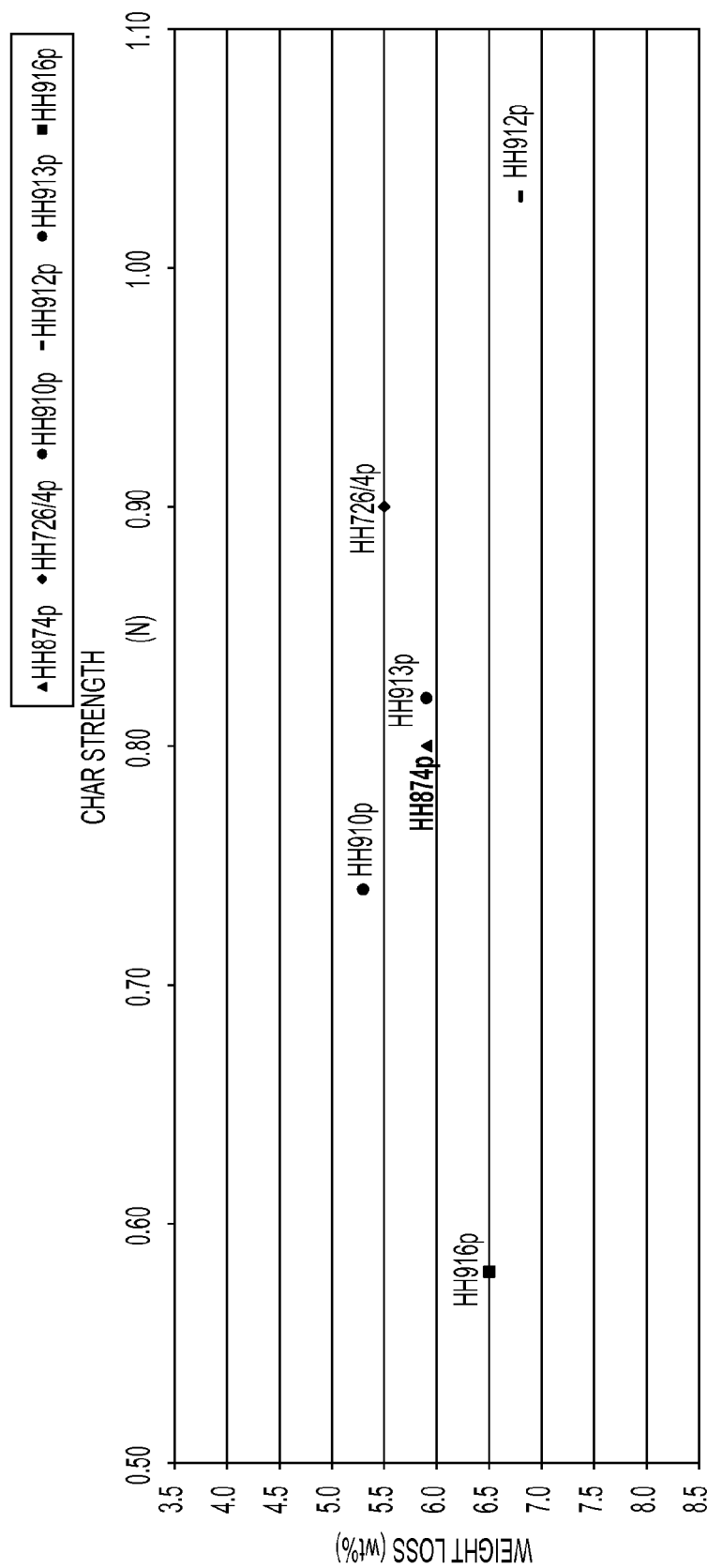
FIG. 6 is a plot showing the flame retardant performance with respect to char strength and basis weight loss percentage for samples of nonwoven fabrics shown in FIG. 1 where the nonwoven fabrics comprise 60/40 wt/wt and 60/20/20 wt/wt/wt combinations of rayon and one or two of acrylic, modacrylic, or polyester fibers.
Figure 7:
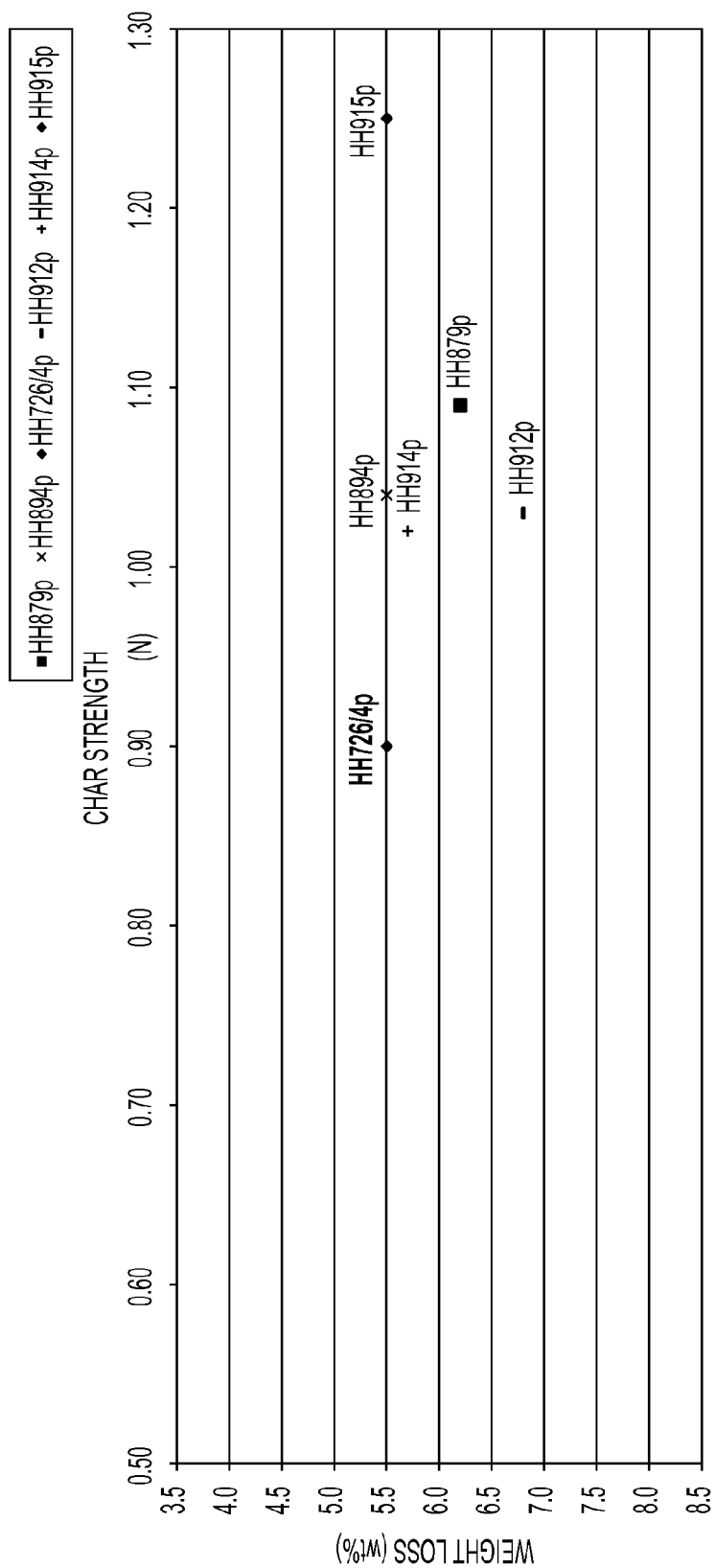
FIG. 7 is a plot showing the flame retardant performance with respect to char strength and basis weight loss percentage for selected samples of nonwoven fabrics comprising different combinations and amounts of rayon, acrylic, modacrylic, and/or polyester fibers shown in FIG. 1.

FIGS. 4-7 provide graphs of some selected data points in FIG. 3, which isolate the results for several fiber blend mixing ratios to help show certain comparisons. FIG. 7 shows several data points with the best combined char strength and burn loss results. In FIGS. 3-7, char strength increases from the vertical left-hand side of the graph to the right-hand side. The burn loss weight percentage increases from the horizontal upper side to the bottom side of the graph. Therefore, the upper, right hand corner or quadrant of the graphs (i.e., higher char strength, lower burn loss weight %) reflects more favorable results as compared to the lower, left-hand corner or quadrant of the graphs (i.e., lower char strength, higher burn loss weight %).

As shown by the test results in FIGS. 3-7, in the four minute open flame test, the presence of minor amounts of acrylic fiber, such as in amounts of approximately 20 wt % to approximately 30 wt %, in fiber blends based on cellulosic fiber provided fiber blends that unexpectedly and surprisingly outperformed cellulosic blends formulated with modacrylic fiber used in similar amounts. The fiber blends of acrylic fiber with cellulosic also outperformed in char strength and burn loss weight % cellulosic fiber blends with some alternative fibers of polyester instead of acrylic.

Nonwoven fabrics representative of embodiments of the present invention have been tested in accordance with Technical Bulletin 603 of the State of California Department of Consumer Affairs, and were found to be compliant with those standards. In view of these findings, the present inventors also believe that "FT-603FR" is a reliable accelerated-type flammability screening test for nonwoven fabrics, as it can be performed in a relatively short period of time (4 minutes) and can be predictive of and correlate to fabric performance in a much longer time period flammability test, such as the 30 minute testing of TB-603. Thus, FT-603FR also can be very beneficial and useful in the mattress and upholstery industry in product development, and/or product quality control and assurance programs.

Example 2

Thermal gravimetric analysis was performed on acrylic fiber, modacrylic fiber, and untreated and flame retardant finished nonwoven fabrics comprising 70:30 (wt/wt) blends of rayon and one of acrylic and modacrylic fiber, to evaluate and compare the thermal decomposition properties of these fibrous materials. Thermal gravimetric analysis measures the amount of weight loss as the result of thermal decomposition. The equipment used for this testing was a Perkin Elmer Pyris 1 TGA, which was operated under air atmosphere at a heating rate of 20° C./minute. TGA curves were generated for the TGA analyses conducted. The results of the TGA evaluations are summarized in Table 2. The thermal decomposition stages referenced in Table 2 refer to stages such as described in the above-indicated Hall et al. publication.

TABLE 2

| | | Acrylic Fiber | Modacrylic Fiber | Untreated Acrylic/rayon fabric (30:70) | FR treated Acrylic/rayon fabric (30:70) | Untreated Modacrylic/ rayon fabric (30:70) | FR treated Modacrylic/ rayon fabric (30:70) |
|---|---|---|---|---|---|---|---|
| 1st thermal decomposition | Temp. range(° C.) | 343-413 | 250-281 | 325-373 | 220-274 | 268-343 | 231-297 |
| | Max.Rate (%/min) | 12.5/m at 390° C. | 21%/m at 270° C. | 26%/m at 355° C. | 11%/m at 240° C. | 14.4%/° m at 296° C. | 11.3%/m at 270° C. |
| | % weight loss | 40 | 30 | 56 | 27 | 51 | 35 |
| | % residue | 59 | 69 | 39 | 71 | 46 | 61 |
| 2nd thermal decomposition | Temp. range(° C.) | 623-825 | 583-798 | 373-785 | 274-948 | 343-660 | 297-945 |
| | Max.Rate (%/min) | 6%/m at 750° C. | 5%/m at 640° C. | — | — | — | - |
| | Ave. rate (%/min) | — | — | 1.8 | 1.95 | 2.9 | 1.5 |

TABLE 2-continued

|  | Acrylic Fiber | Modacrylic Fiber | Untreated Acrylic/rayon fabric (30:70) | FR treated Acrylic/rayon fabric (30:70) | Untreated Modacrylic/ rayon fabric (30:70) | FR treated Modacrylic/ rayon fabric (30:70) |
|---|---|---|---|---|---|---|
| % weight loss | 48 | 50 | 39 | 64 | 37 | 52 |
| % residue | 0 | 0 | 0 | 6.7 | 3 | 9 |
| Temp. reaches 50% wt. loss | 608 | 562 | 363 | 474 | 345 | 407 |
| Temp. reaches 99% wt. loss | 827 | 861 | 768 | n/a | n/a | n/a |
| Final residue | 0.19% at 948° C. | 0.25% at 948° C. | 0.26% at 948° C. | 6.7% at 948° C. | 2.8% at 948° C. | 8.9% at 948° C. |

With respect to the TGA test results for the fibers, the results of the TGA analysis show that thermal decomposition occurs at a lower temperature in modacrylic fibers than acrylic fibers, but the end temperature is higher than for acrylic fiber. This indicates lower thermal stability of modacrylic fiber. The maximum rate of decomposition is higher in modacrylic fiber, but occurs at a lower temperature than acrylic. Char yields of modacrylic and acrylic fibers does not show a significant difference. In moderate ranges (600-800° C.), acrylic yields more chars, but in the final stage of pyrolysis (800-850° C.), modacrylic fibers yield more chars. The TGA analysis for the fibers shows some alteration of the thermal decomposition mechanism. With respect to the TGA test results for the unfinished fabrics, the fabric results show similar trends with the fibers. Thermal decomposition occurs at a lower temperature in modacrylics. This indicates lower thermal stability of modacrylic fabric. At about 700° C., the acrylic-containing fabric yields more chars but it keeps decomposing, and eventually reaches to 0% char yield, while thermal decomposition of modacrylic-containing fabric finished at around 650° C. In the final stage (750-900° C.), modacrylic-containing fabric forms more char. Both the acrylic-containing and the modacrylic-containing fabrics show three distinct stages of thermal decomposition (i.e., three peaks in the decomposition rate curves (not shown)). The maximum rate of decomposition is lower in modacrylic-containing fabric and it occurs at a lower temperature. The TGA analysis for the unfinished fabrics shows some alteration of thermal decomposition mechanism. With respect to the TGA test results for the flame retardant finished fabrics, the flame retardant finish was found to reduce the first thermal decomposition temperature in both acrylic- and modacrylic-containing fabrics, and increase the amount of char formed in acrylic and modacrylic fabrics. The TGA analysis performed for the flame retardant treated/finished fabrics shows a different thermal decomposition behavior between acrylic-containing fabrics and the modacrylic-containing fabrics.

From the foregoing, it will be observed that modifications and variations can be affected without departing from the true spirit and scope of the novel concepts of the present invention. It is to be understood that no specific limitation with respect to the specific embodiments illustrated herein is intended or should be inferred. This invention can, however, be embodied in different forms and should not be construed as limited to the embodiments set forth herein; rather, these embodiments are provided so that this disclosure will be thorough and complete, and will fully convey the scope of the invention to those skilled in the art.

What is claimed is:

1. A flame retardant finished nonwoven fabric, comprising at least about 15 wt % and no greater than about 35 wt % acrylic fiber and at least about 65 wt % and no greater than about 85 wt % cellulosic fiber, wherein said nonwoven fabric has a char strength of at least 0.9 Newtons as determined by ASTM Test Method D4032 and exhibits a basis weight loss of no more than 7 wt % after exposure to a gas flame for 240 seconds.

2. The flame retardant finished nonwoven fabric of claim 1, wherein said nonwoven fabric comprises a char strength of at least about 10% greater and exhibits a basis weight loss of at least about 3% less after exposure to a gas flame for 240 seconds than the nonwoven fabric with the acrylic fiber replaced by modacrylic fiber.

3. The flame retardant finished nonwoven fabric of claim 1, wherein the finished nonwoven fabric has a basis weight of at least about 2 ounces/square yard and no greater than about 7.5 ounces/square yard.

4. The flame retardant finished nonwoven fabric of claim 1, wherein the finished nonwoven fabric has a basis weight of at least about 2 ounces/square yard and no greater than about 4.5 ounces/square yard.

5. The flame retardant finished nonwoven fabric of claim 1, wherein the acrylic fiber and the cellulosic fiber comprise at least about 95 wt % of total fiber content of the nonwoven fabric.

6. The flame retardant finished nonwoven fabric of claim 1, wherein the cellulosic fiber is selected from the group consisting of rayon, wood pulp, lyocell, cotton, jute, ramie, bamboo, and any combinations thereof.

7. The flame retardant finished nonwoven fabric of claim 1, wherein the cellulosic fiber comprises rayon.

8. The flame retardant finished nonwoven fabric of claim 1, wherein the nonwoven fabric further comprises a coating comprising a flame retardant agent.

9. The flame retardant finished nonwoven fabric of claim 1, wherein said nonwoven fabric has a char strength of at least 1.0 Newtons as determined by ASTM Test Method D4032, and exhibits a basis weight loss of no more than 6.5 wt % when exposed to a gas flame for 240 seconds.

10. The flame retardant finished nonwoven fabric of claim 1, wherein said nonwoven fabric has a char strength of at least 1.0 Newtons as determined by ASTM Test Method D4032, and exhibits a basis weight loss of no more than 6 wt % when exposed to a gas flame for 240 seconds.

11. A flame retardant finished nonwoven fabric, comprising at least about 15 wt % and no greater than about 25 wt % acrylic fiber, at least about 55 wt % and no greater than about 65 wt % cellulosic fiber, and at least about 15 wt % and no greater than about 25 wt % polyester fiber, wherein said nonwoven fabric has a char strength of at least 0.9 Newtons as determined by ASTM Test Method D4032 and exhibits a basis weight loss of no more than 7 wt % after exposure to a gas flame for 240 seconds.

12. A bedding article comprising a flame retardant finished nonwoven fabric comprising at least about 15 wt % and no greater than about 35 wt % acrylic fiber and at least about 65 wt % and no greater than about 85 wt % cellulosic fiber, wherein said nonwoven fabric has a char strength of at least 0.9 Newtons as determined by ASTM Test Method D4032, and exhibits a basis weight loss of no more than 7 wt % when exposed to a gas flame for 240 seconds.

13. The bedding article of claim 12, wherein said nonwoven fabric comprises a char strength of at least about 10% greater and exhibits a basis weight loss of at least about 3% less after exposure to a gas flame for 240 seconds than the nonwoven fabric with the acrylic fiber replaced by modacrylic fiber.

14. The bedding article of claim 12, wherein the bedding article is selected from the group consisting of a mattress, a mattress ticking, and a mattress foundation.

15. The bedding article of claim 12, wherein the finished nonwoven fabric has a basis weight of at least about 2 ounces/square yard and no greater than about 7.5 ounces/square yard.

16. The bedding article of claim 12, wherein the finished nonwoven fabric has a basis weight of at least about 2 ounces/square yard and no greater than about 4.5 ounces/square yard.

17. The bedding article of claim 12, wherein the cellulosic fiber is selected from the group consisting of rayon, wood pulp, lyocell, cotton, jute, ramie, bamboo, and any combinations thereof.

18. The bedding article of claim 12, wherein said nonwoven fabric has a char strength of at least 1.0 Newtons as determined by ASTM Test Method D4032, and exhibits a basis weight loss of no more than 6.5 wt % when exposed to a gas flame for 240 seconds.

19. The bedding article of claim 12, wherein said nonwoven fabric has a char strength of at least 1.0 Newtons as determined by ASTM Test Method D4032, and exhibits a basis weight loss of no more than 6 wt % when exposed to a gas flame for 240 seconds.

20. A bedding article comprising a flame retardant finished nonwoven fabric comprising at least about 15 wt % and no greater than about 25 wt % acrylic fiber, at least about 55 wt % and no greater than about 65 wt % cellulosic fiber, and at least about 15 wt % and no greater than about 25 wt % polyester fiber, wherein said nonwoven fabric has a char strength of at least 0.9 Newtons as determined by ASTM Test Method D4032, and exhibits a basis weight loss of no more than 7 wt % when exposed to a gas flame for 240 seconds.

* * * * *